US010275018B2

(12) United States Patent
Du

(10) Patent No.: US 10,275,018 B2
(45) Date of Patent: *Apr. 30, 2019

(54) TOUCH INTERACTION METHODS AND SYSTEMS USING A HUMAN BODY AS A SIGNAL TRANSMISSION MEDIUM

(71) Applicant: Beijing Zhigu Rui Tuo Tech Co., Ltd, Beijing (CN)

(72) Inventor: Lin Du, Beijing (CN)

(73) Assignee: Beijing Zhigu Rui Tuo Tech Co., Ltd, Beijing (CN)

(*) Notice: Subject to any disclaimer, the term of this patent is extended or adjusted under 35 U.S.C. 154(b) by 65 days.

This patent is subject to a terminal disclaimer.

(21) Appl. No.: 15/302,979

(22) PCT Filed: Mar. 12, 2015

(86) PCT No.: PCT/CN2015/074067
§ 371 (c)(1),
(2) Date: Oct. 7, 2016

(87) PCT Pub. No.: WO2015/154602
PCT Pub. Date: Oct. 15, 2015

(65) Prior Publication Data
US 2017/0031474 A1 Feb. 2, 2017

(30) Foreign Application Priority Data
Apr. 11, 2014 (CN) .......................... 2014 1 0145482

(51) Int. Cl.
*G06F 3/01* (2006.01)
*G06F 3/043* (2006.01)

(52) U.S. Cl.
CPC .............. *G06F 3/011* (2013.01); *G06F 3/014* (2013.01); *G06F 3/043* (2013.01)

(58) Field of Classification Search
CPC .......... G06F 3/011; G06F 3/015; G06F 3/043; G06F 3/044; G06F 3/046; G06F 3/014;
(Continued)

(56) References Cited

U.S. PATENT DOCUMENTS 8,223,589 B2 7/2012 Liu
8,562,531 B2 10/2013 Yoshikawa et al.
(Continued)

FOREIGN PATENT DOCUMENTS

CN 1705460 A 12/2005
CN 101106944 A 1/2008
(Continued)

OTHER PUBLICATIONS

International Search Report for PCT Application No. PCT/CN2015/074067, dated Jun. 29, 2015, 3 pages.

*Primary Examiner* — Darlene M Ritchie
(74) *Attorney, Agent, or Firm* — Amin, Turocy & Watson, LLP

(57) ABSTRACT

Interaction methods and systems are provided relating to the field of information interaction. A method comprises: sending a first wave signal; in response to contact between a user body and an object, receiving a second wave signal that corresponds to the first wave signal after the first wave signal is transmitted by using a medium comprising at least a part of the user body; and obtaining a parameter of the contact between the user body and the object according to a signal characteristic of the received second wave signal. The interaction method and system can help a user to naturally and efficiently complete an information interaction process, simplify an interaction process, and improve the interaction efficiency.

21 Claims, 3 Drawing Sheets

(58) Field of Classification Search
CPC ..... A61B 5/02438; A61B 5/0816; A61B 8/08; A61B 8/0841
See application file for complete search history.

(56) References Cited

U.S. PATENT DOCUMENTS

| | | | |
|---|---|---|---|
| 8,622,908 B2 | 1/2014 | Matsumura | |
| 8,665,210 B2 | 3/2014 | Tan et al. | |
| 2003/0036696 A1 | 2/2003 | Parker | |
| 2004/0167409 A1 | 8/2004 | Lo et al. | |
| 2004/0267133 A1 | 12/2004 | Podany | |
| 2006/0052702 A1 | 3/2006 | Matsumura et al. | |
| 2008/0244468 A1* | 10/2008 | Nishihara | G06F 3/017 715/863 |
| 2009/0046059 A1 | 2/2009 | Hou et al. | |
| 2009/0177083 A1* | 7/2009 | Matsumura | A61B 8/08 600/437 |
| 2009/0240133 A1* | 9/2009 | Friedman | A61B 5/02028 600/407 |
| 2009/0306462 A1* | 12/2009 | Lechner | A61B 17/1355 600/37 |
| 2010/0199232 A1* | 8/2010 | Mistry | G06F 1/163 715/863 |
| 2011/0148419 A1 | 6/2011 | Cho et al. | |
| 2011/0279250 A1* | 11/2011 | Ryhanen | G06F 3/016 340/407.2 |
| 2011/0282623 A1 | 11/2011 | Schneider et al. | |
| 2012/0146892 A1 | 6/2012 | Hamada et al. | |
| 2012/0162057 A1* | 6/2012 | Tan | G06F 3/011 345/156 |
| 2013/0016070 A1* | 1/2013 | Starner | G02B 27/017 345/175 |
| 2013/0237798 A1* | 9/2013 | Pal | A61B 5/0816 600/407 |
| 2013/0265437 A1* | 10/2013 | Thorn | G06F 3/011 348/164 |
| 2014/0176467 A1 | 6/2014 | Dahl et al. | |
| 2015/0233998 A1* | 8/2015 | Chen | G01R 31/086 324/764.01 |
| 2015/0242024 A1* | 8/2015 | Majava | G04G 21/08 345/174 |
| 2015/0272458 A1* | 10/2015 | Magniez | A61B 5/02438 600/479 |
| 2016/0098083 A1* | 4/2016 | Keesling | G06F 3/014 345/156 |
| 2016/0328082 A1* | 11/2016 | Argiro | G06F 3/0416 |

FOREIGN PATENT DOCUMENTS

| | | |
|---|---|---|
| CN | 101150989 A | 3/2008 |
| CN | 201491012 U | 5/2010 |
| CN | 101926658 A | 12/2010 |
| CN | 102467905 A | 5/2012 |
| CN | 102854978 A | 1/2013 |
| CN | 103927009 A | 7/2014 |
| CN | 103941867 A | 7/2014 |
| WO | 2004107963 A2 | 12/2004 |
| WO | 2012172322 A2 | 12/2012 |
| WO | 2015158188 A1 | 10/2015 |

* cited by examiner

TOUCH INTERACTION METHODS AND SYSTEMS USING A HUMAN BODY AS A SIGNAL TRANSMISSION MEDIUM

RELATED APPLICATION

The present application is a U.S. National Stage filing under 35 U.S.C. § 371 of international patent cooperation treaty (PCT) application No. PCT/CN2015/074067, filed Mar. 12, 2015, and entitled "INTERACTION METHODS AND SYSTEMS", which claims the benefit of priority to Chinese Patent Application No. 201410145482.X, filed on Apr. 11, 2014, which applications are hereby incorporated into the present application by reference herein in their respective entireties.

TECHNICAL FIELD

The present application relates to the field of information interaction technologies, and in particular, to interaction methods and systems.

BACKGROUND

With the development of electronic devices, wearable devices are proposed by people, and are gradually accepted by people. Wearable devices such as smart glasses, smart watches, and smart rings bring about great convenience for people's daily life.

Wearable devices usually have characteristics such as catering for users, compactness, portability, and low power consumption; however, because of these characteristics, wearable devices usually have a poor interaction capability.

SUMMARY

An example, non-limiting objective of the present application is to provide natural and efficient interaction methods and systems.

According to an example aspect of at least one embodiment of the present application, an interaction method is provided, wherein the method comprises:

sending a first wave signal;

in response to contact between a user body and an object, receiving a second wave signal that corresponds to the first wave signal after the first wave signal is transmitted by using a medium comprising at least a part of the user body; and obtaining a parameter of the contact between the user body and the object according to a signal characteristic of the received second wave signal.

According to another example aspect of at least one embodiment of the present application, an interaction system is provided, wherein the system comprises:

a sending module, configured to send a first wave signal;

a receiving module, configured to: in response to contact between a user body and an object, receive a second wave signal that corresponds to the first wave signal after the first wave signal is transmitted by using a medium comprising at least a part of the user body; and a processing module, configured to obtain a parameter of the contact between the user body and the object according to a signal characteristic of the received second wave signal.

The interaction methods and systems according to at least one embodiment of the present application can help a user to naturally and efficiently complete an information interaction process, simplify an interaction process, and improve the interaction efficiency.

DETAILED DESCRIPTION

Various embodiments of the present application are further described in detail with reference to accompanying drawings and embodiments. The following embodiments are used to describe the present application, but are not intended to limit the scope of the present application.

A person skilled in the art understands that sequence numbers of the following steps do not mean execution sequences in embodiments of the present application. The execution sequences of the steps should be determined according to functions and internal logic of the steps, and should not be construed as any limitation on the implementation processes of the embodiments of the present application.

In the embodiments of the present application, a wave signal is a signal transmitted in a form of a wave, and may be, for example, an electromagnetic wave signal or an acoustic wave signal. The inventor also finds in researches that an ultrasonic wave is an acoustic wave with frequency higher than 20000 Hz; the ultrasonic wave has desirable directivity and a strong penetration capability, and therefore, relatively concentrated sound energy is easily obtained. The ultrasonic wave has a long transmission distance in water, and around 65% of constituents of a human body are water; therefore, ultrasonic wave information is desirably transmitted by using a human body as a transmission medium. Besides, frequency of the ultrasonic wave is beyond the human hearing range; therefore, a user cannot perceive the existence of an ultrasonic wave signal, and consequently the user is not affected by noise. In addition, an electromagnetic wave signal with frequency lower than 100 MHz is also desirably transmitted through a human body, and is desirably applicable to the embodiments of the present application.

Figure 1:
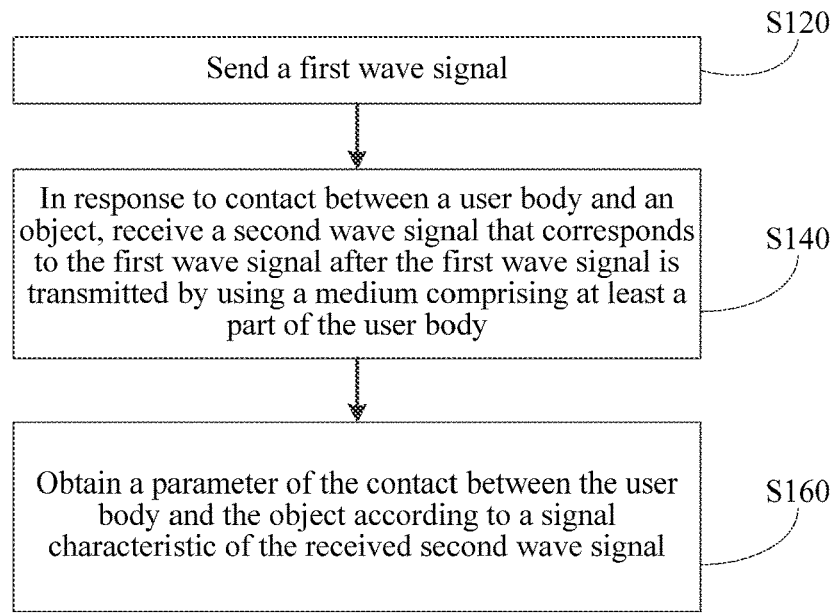
FIG. 1 is an example flowchart of an interaction method according to an embodiment of the present application.

FIG. 1 is a flowchart of an interaction method according to an embodiment of the present application, wherein the method may be implemented in, for example, an interaction system. As shown in FIG. 1, the method comprises:

S120: Send a first wave signal.

S140: In response to contact between a user body and an object, receive a second wave signal that corresponds to the first wave signal after the first wave signal is transmitted by using a medium comprising at least a part of the user body.

S160: Obtain a parameter of the contact between the user body and the object according to a signal characteristic of the received second wave signal.

In the method according to this embodiment of the present application, a first wave signal is sent; in response to contact between a user body and an object, a second wave signal that corresponds to the first wave signal after the first wave signal is transmitted by using a medium comprising at least a part of the user body is received; and a parameter of the contact between the user body and the object can be obtained according to a signal characteristic of the received second wave signal. In this way, in a process of contact between the user body and an external object, information interaction with the contacted object is naturally and efficiently completed.

Functions of step S120, step S140, and step S160 are described in detail below with reference to FIG. 1.

S120: Send a first wave signal.

The first wave signal may be, for example, an ultrasonic wave signal or an electromagnetic wave signal with frequency lower than 100 MHz.

In this method, the first wave signal may be periodically sent, for example, the first wave signal is sent each second, or the first wave signal may be sent as triggered by a user, for example, the first wave signal starts to be sent in response to pressing, by the user, a key.

S140: In response to contact between a user body and an object, receive a second wave signal that corresponds to the first wave signal after the first wave signal is transmitted by using a medium comprising at least a part of the user body.

The contact is not limited to direct contact, and also comprises indirect contact (for example, holding a mouse while wearing a glove).

The user body may comprise clothes that the user wears, an accessory that the user wears or the like, such as a glove that the user wears. The object may comprise non-life entities such as a desk, a cup, a mouse, and a game handle, and may also comprise life entities such as a human body, an animal, and a tree.

The at least a part of the user body may be positions such as the head, the hand, and the leg of the user, and the at least a part of the user body is related to a position in which the user body contacts the object, for example, when a finger of the user contacts the object, the at least a part of the user body usually comprises the hand of the user. In consideration of frequency at which different positions of a human body contact an external object, the at least a part of the user body is more possibly a hand of the user, for example, a palm of the user or a finger of the user. Therefore, the second wave signal is received on a hand of the user, which complies with a life habit of the user to a greater extent, and is more natural and efficient.

In an example embodiment, the second wave signal is formed after the first wave signal is reflected by the object. That is, after being sent, the first wave signal is transmitted along the user body in a first direction to the object; the second wave signal is formed after the first wave signal is reflected by the object; the second wave signal is transmitted along the user body in a direction opposite to the first direction and is received. For example, the interaction system comprises a transmitter that sends the first wave signal and a receiver that receives the second wave signal, wherein both the transmitter and the receiver are disposed in a wrist strap of the right hand of the user. After the transmitter sends the first wave signal, the first wave signal is transmitted along the skin of the right hand of the user to an object that the palm of the right hand of the user contacts; the second wave signal is formed after the first wave signal is reflected by the object; the second wave signal is transmitted back through the skin of the right hand of the user and is received by the receiver.

In another example embodiment, the second wave signal is formed after the first wave signal penetrates through the object. That is, after being sent, the first wave signal is transmitted along a first part of the user body to the object; the second wave signal is formed after the first wave signal penetrates through the object; the second wave signal is transmitted along a second part of the user body and is received. In this case, two positions of the user body contact the object. Assuming that the first part of the user body corresponds to a first position, the second part of the user body corresponds to a second position, in the case in which a parameter of contact between the first position and the object needs to be obtained, it should be ensured that contact between the second position and the object is sufficiently desirable, that is, a transmittance of the second wave signal on an interface on which the second position contacts the object is greater than a preset threshold; similarly, in the case in which a parameter of the contact between the second position and the object needs to be obtained, it should be ensured that the contact between the first position and the object is sufficiently desirable, that is, a transmittance of the first wave signal on an interface on which the first position contacts the object is greater than a preset threshold. For example, the interaction system comprises a transmitter that sends the first wave signal and a receiver that receives the second wave signal, wherein the transmitter is disposed in a wrist strap of the right hand of the user, and the receiver is disposed in a wrist strap of the left hand of the user. After the transmitter sends the first wave signal, the first wave signal is transmitted along the skin of the right hand of the user to an object that the palm of the right hand of the user contacts; the second wave signal is formed after the first wave signal penetrates through the object; the second wave signal passes through an interface on which the palm of the left hand of the user contacts the object and is transmitted through the skin of the left hand of the user and is received by the receiver. In this case, to obtain a parameter of contact between the palm of the right hand of the user and the object, a silicone pad may be disposed between the palm of the left hand of the user and the object to ensure sufficiently desirable contact.

S160: Obtain a parameter of the contact between the user body and the object according to a signal characteristic of the received second wave signal.

The inventor finds in researches that contact parameters are different, for example, contact strengths, contact areas, and contact types are different; therefore, signal characteristics of a wave signal received after the same wave signal passes through an interface on which the user body contacts the object are obviously different. The contact types correspond to different contact manners, for example, holding with a palm, pressing with a palm, and clicking with a finger.

Therefore, in an example embodiment, a signal source may be made to send the same first wave signal; in response to contact between the user body and an object, the second wave signal formed after the first wave signal is reflected by or penetrates through the object is received; the parameter of the contact between the user body and the object can be then obtained according to a signal characteristic, corresponding to a reference contact parameter, of the second wave signal and the signal characteristic of the received second wave signal, which may specifically comprise:

S161: Create a classifier according to the signal characteristic, corresponding to the reference contact parameter, of the second wave signal.

S162: Perform a classification calculation according to the classifier and the signal characteristic of the received second wave signal, and obtain the parameter of the contact between the user body and the object according to a calculation result.

The signal characteristic, corresponding to the reference contact parameter, of the second wave signal may be pre-determined by means of an experiment and pre-stored. For example, manufacturer personnel or the user pre-holds and pre-presses a corresponding object with different contact strengths, and separately records corresponding signal characteristics of the second wave signal, so as to obtain the signal characteristic, corresponding to the reference contact parameter, of the second wave signal. The signal characteristic, corresponding to the reference contact parameter, of the second wave signal may be stored in a storage of a device or in a network server, so that the signal characteristic, corresponding to the reference contact parameter, of the second wave signal may be invoked in actual use of the method.

The contact parameter may further comprise a contact time, and the contact time may be determined according to a duration corresponding to the signal characteristic of the received second wave signal.

The reference contact parameter may be a specific parameter value, for example, corresponding signal characteristics of the second wave signal in the case in which strengths of contact between the hand of the user and the object are specific parameters such as 90N, 80N, and 70N may be pre-determined by using an experiment. Besides, the reference contact parameter may also be a specific parameter interval, for example, corresponding signal characteristics of the second wave signal in the case in which strengths of contact between the hand of the user and the object are specific parameter intervals such as (85N, 95N), (75N, 85N), and (65N, 75N) may be pre-determined by using an experiment.

The signal characteristic of the second wave signal may be related to at least one of an amplitude, a phase, and a frequency spectrum of the second wave signal. Specifically, the signal characteristic of the second wave signal may comprise at least one of a fingerprint, an average value, and a difference, wherein the fingerprint may be formed by at least one of the amplitude, the phase, and the frequency spectrum of the second wave signal; the average value may be an average value of at least one of the amplitude, the phase, and the frequency spectrum of the second wave signal; and the difference may be a difference of at least one of the amplitude, the phase, and the frequency spectrum of the second wave signal.

In addition, a person skilled in the art understands that the parameter of the contact between the user body and the object obtained according to the signal characteristic of the received second wave signal may further be a combination of any two or more of a contact strength, a contact area, a contact type, and a contact time. For example, it is obtained according to the signal characteristic of the received second wave signal that contact between the hand of the user and an object has a strength within the range of (85N, 95N) and lasts 3 s, and then the contact has a strength within the range of (65N, 75N) and lasts 2 s, and then the contact has a strength within the range of (85N, 95N) and again lasts 3 s.

Figure 2:
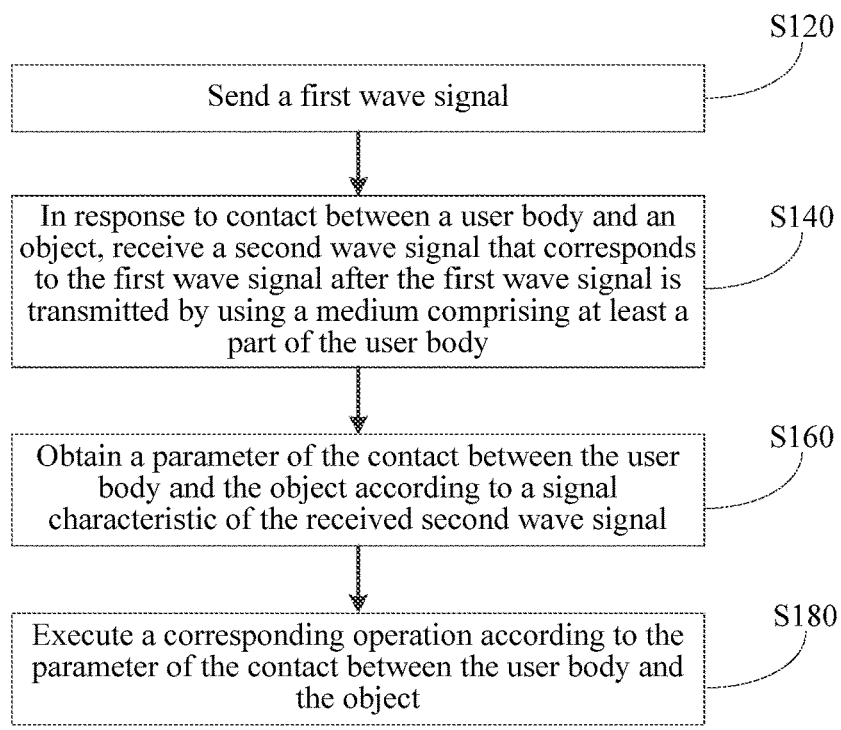
FIG. 2 is an example flowchart of an example embodiment of an interaction method according to an embodiment of the present application.

Referring to FIG. 2, in an example embodiment of the present application, the method may further comprise:

S180: Execute a corresponding operation according to the parameter of the contact between the user body and the object.

The executing a corresponding operation may comprise switching a mode, inputting content, prompting a user, matching a device, and the like.

For example, in a process of a shooting game of the user, a pressure of contact between the user and a toy gun may be monitored, and in response to that the contact pressure is greater than a preset value, the toy gun manipulated by the user may be controlled to switch from a handgun mode to a submachine gun mode. In this way, the user is only required to press the toy gun with a slightly great strength to switch between weapons of different types. Certainly, after switch between weapons is completed, the user may further be prompted by using a speech, a text, or the like, for example, the user is notified, by using a speech, that a handgun has been currently switched to a submachine gun.

Or, for example, in a process of a shooting game of the user, a pressure and a time of contact between the user and a toy gun may be monitored, and in response to that the contact pressure is first greater than a first preset value, then less than a second preset value, and then greater than the first preset value, a gun loading command may be entered into a game console. In this way, the user can complete gun loading without leaving a screen while manipulating the toy gun or adjusting a muzzle angle, which helps to improve game experience. Certainly, after gun loading is completed, the user may further be prompted by using a speech, a text, or the like, for example, the user is notified, by using a speech, that currently a gun is fully loaded.

Or, for example, a pressure of contact between the user and a car steering wheel may be monitored, and in response to that the contact pressure is greater than a preset value, a smart phone of the user may be controlled to automatically match and establish a connection with a Bluetooth headset of the user. In this way, the user can answer, during driving, a call by using the Bluetooth headset without configuring a connection, which improves driving safety.

In addition, an embodiment of the present application further provides a computer readable medium, which comprises a computer readable instruction that performs the following operations when being executed: executing operations of step S120, step S140, and step S160 of the method in the example embodiment shown in FIG. 1.

In conclusion, in the method according to this embodiment of the present application, a parameter of contact between a user body and an object can be obtained according to a signal characteristic of a received second wave signal, and a corresponding operation such as switching a mode, inputting content, matching a device, and prompting a user can be performed according to the contact parameter. In this way, information interaction between a user and the object or a corresponding device is naturally and efficiently completed.

Figure 3:
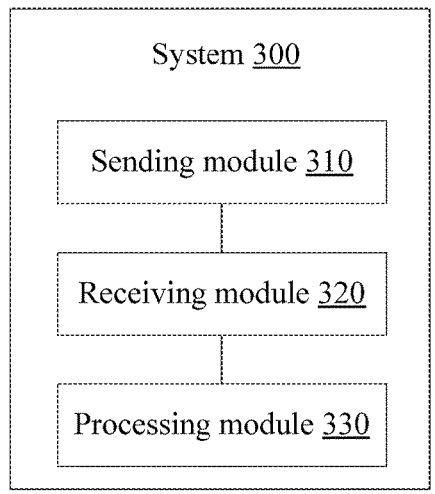
FIG. 3 is an example structural diagram of modules of an interaction system according to an embodiment of the present application.

FIG. 3 is a schematic structural diagram of modules of an interaction system 300 according to an embodiment of the present application, wherein the interaction system 300 may be a wearable device such as a wrist strap or a ring.

As shown in FIG. 3, the interaction system 300 comprises:

a sending module 310, configured to send a first wave signal;

a receiving module 320, configured to: in response to contact between a user body and an object, receive a second wave signal that corresponds to the first wave signal after the first wave signal is transmitted by using a medium comprising at least a part of the user body; and a processing module 330, configured to obtain a parameter of the contact between the user body and the object according to a signal characteristic of the received second wave signal.

In the system according to this embodiment of the present application, the sending module 310 sends a first wave signal; in response to contact between a user body and an object, the receiving module 320 receives a second wave signal that corresponds to the first wave signal after the first wave signal is transmitted by using a medium comprising at least a part of the user body; and the processing module 330 can obtain a parameter of the contact between the user body and the object according to a signal characteristic of the received second wave signal. In this way, in a process of contact between the user body and an external object, information interaction with the contacted object is naturally and efficiently completed.

Functions of the sending module 310, the receiving module 320, and the processing module 330 are described in detail below with reference to FIG. 3.

The sending module 310 is configured to send a first wave signal.

The sending module 310 may periodically send the first wave signal, for example, send the first wave signal each second, or send the first wave signal as triggered by a user, for example, start to send the first wave signal in response to pressing, by the user, a key.

The receiving module 320 is configured to: in response to contact between a user body and an object, receive a second wave signal that corresponds to the first wave signal after the first wave signal is transmitted by using a medium comprising at least a part of the user body.

The receiving module 320 may enter a listening state after the sending module 310 is started; and in response to contact between the user body and an object, receive the second wave signal.

The contact is not limited to direct contact, and also comprises indirect contact (for example, holding a mouse while wearing a glove).

The user body may comprise clothes that the user wears, an accessory that the user wears, or the like, such as a glove that the user wears. The object may comprise non-life entities such as a desk, a cup, a mouse, and a game handle, and may also comprise life entities such as a human body, an animal, and a tree.

The at least a part of the user body may be positions such as the head, the hand, and the leg of the user, and the at least a part of the user body is related to a position in which the user body contacts the object, for example, when a finger of the user contacts the object, the at least a part of the user body usually comprises the hand of the user. In consideration of frequency at which different positions of a human body contact an external object, the at least a part of the user body is more possibly a hand of the user, for example, a palm of the user or a finger of the user. Therefore, the receiving module 320 is disposed on the hand of the user to receive the second wave signal, which complies with a life habit of the user to a greater extent, and is more natural and efficient.

In an example embodiment, the second wave signal is formed after the first wave signal is reflected by the object. In this example embodiment, the receiving module 320 and the sending module 310 are disposed in the same wearable device in an integrated manner, for example, both the receiving module 320 and the sending module 310 are disposed in a wrist strap. In this case, in response to contact between the user body and an object, the receiving module 320 receives an echo signal, that is, the second wave signal, formed after the first wave signal is transmitted through the hand of the user and is reflected by the object.

In another example embodiment, the second wave signal is formed after the first wave signal penetrates through the object. In this example embodiment, the receiving module 320 and the sending module 310 are separately disposed in different wearable devices, for example, the receiving module 320 is disposed in a wrist strap of the left hand, and the sending module 310 is disposed in a wrist strap of the right hand. In this case, in response to that both the left hand and the right hand of the user contact an object, the receiving module 320 receives a wave signal, that is, the second wave signal, formed after the first wave signal sequentially transmits through the right hand of the user, penetrates through the object, and transmits through the left hand of the user. Besides, in this case, if a parameter of contact between the left hand of the user and the object needs to be obtained, it should be ensured that contact between the right hand of the user and the object is sufficiently desirable; similarly, if a parameter of contact between the right hand of the user and the object needs to be obtained, it should be ensured that contact between the left hand of the user and the object is sufficiently desirable.

The processing module 330 is configured to obtain a parameter of the contact between the user body and the object according to a signal characteristic of the received second wave signal.

The inventor finds in researches that contact parameters are different, for example, contact strengths, contact areas, and contact types are different; therefore, signal characteristics of a wave signal received after the same wave signal passes through an interface on which the user body contacts the object are obviously different. The contact types correspond to different contact manners, for example, holding with a palm, pressing with a palm, and clicking with a finger.

Therefore, in an example embodiment, the sending module 310 may be made to send the same first wave signal; and in response to contact between the user body and an object, the receiving module 320 receives the second wave signal formed after the first wave signal is reflected by or penetrates through the object; then the processing module 330 can obtain the parameter of the contact between the user body and the object according to a signal characteristic, corresponding to a reference contact parameter, of the second wave signal and the signal characteristic of the received second wave signal.

Figure 4:
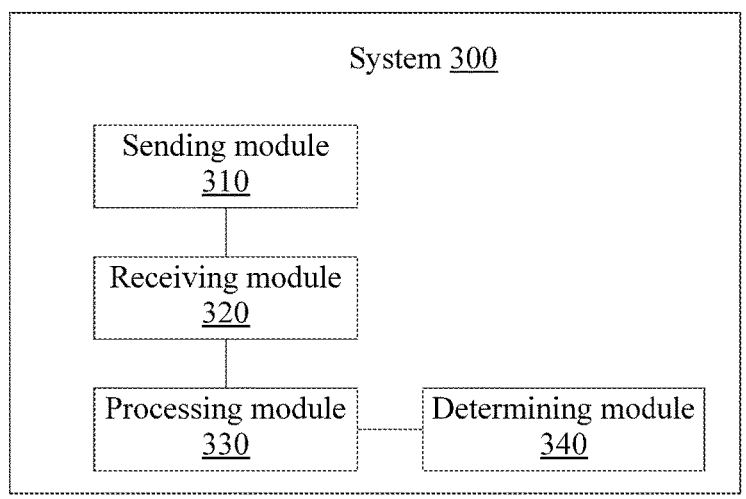
FIG. 4 is an example structural diagram of modules in an example embodiment of an interaction system according to an embodiment of the present application.

The signal characteristic, corresponding to the reference contact parameter, of the second wave signal may be pre-determined by means of an experiment and pre-stored. For example, manufacturer personnel or the user pre-holds and pre-presses a corresponding object with different contact strengths, and separately records corresponding signal characteristics of the second wave signal, so as to obtain the signal characteristic, corresponding to the reference contact parameter, of the second wave signal. Referring to FIG. 4, in an example embodiment, the interaction system 300 further comprises:

a determining module 340, configured to pre-determine the signal characteristic, corresponding to the reference contact parameter, of the second wave signal.

The signal characteristic, corresponding to the reference contact parameter, of the second wave signal may be stored in a storage of the system 300 or a network server, so that the signal characteristic, corresponding to the reference contact parameter, of the second wave signal is invoked by the system 300 in actual use.

The contact parameter may further comprise a contact time, and the contact time may be determined according to duration corresponding to the signal characteristic of the received second wave signal.

The reference contact parameter may be a specific parameter value, for example, corresponding signal characteristics of the second wave signal in the case in which strengths of contact between the hand of the user and the object are specific parameters such as 90N, 80N, and 70N may be pre-determined by using an experiment. Besides, the reference contact parameter may also be a specific parameter interval, for example, corresponding signal characteristics of the second wave signal in the case in which strengths of contact between the hand of the user and the object are specific parameter intervals such as (85N, 95N), (75N, 85N), and (65N, 75N) may be pre-determined by using an experiment.

The signal characteristic of the second wave signal may be related to at least one of an amplitude, a phase, and a frequency spectrum of the second wave signal. Specifically, the signal characteristic of the second wave signal may comprise at least one of a fingerprint, an average value, and a difference, wherein the fingerprint may be formed by at least one of the amplitude, the phase, and the frequency spectrum of the second wave signal; the average value may be an average value of at least one of the amplitude, the phase, and the frequency spectrum of the second wave signal; and the difference may be a difference of at least one of the amplitude, the phase, and the frequency spectrum of the second wave signal.

In addition, a person skilled in the art understands that the parameter of the contact between the user body and the object obtained according to the signal characteristic of the received second wave signal may further be a combination of any two or more of a contact strength, a contact area, a contact type, and a contact time. For example, it is obtained according to the signal characteristic of the received second wave signal that contact between the hand of the user and an object has a strength within the range of (85N, 95N) and lasts 3 s, and then the contact has a strength within the range of (65N, 75N) and lasts 2 s, and then the contact has a strength within the range of (85N, 95N) and again lasts 3 s.

Figure 5:
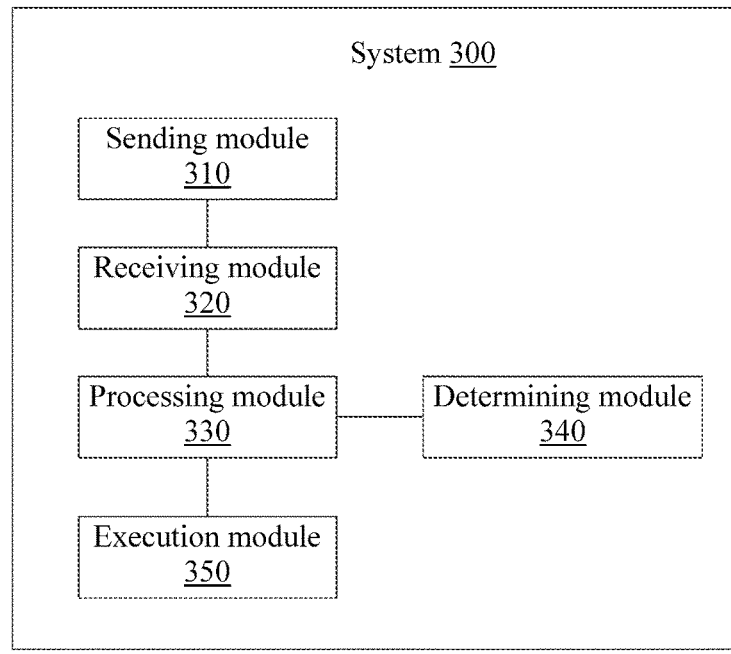
FIG. 5 is an example structural diagram of modules in another example embodiment of an interaction system according to an embodiment of the present application.

Referring to FIG. 5, in an example embodiment of the present application, the interaction system further comprises:

an execution module 350, configured to execute a corresponding operation according to the parameter of the contact between the user body and the object.

The executing a corresponding operation may comprise switching a mode, inputting content, prompting a user, matching a device, and the like.

For example, in a process of a shooting game of the user, the system 300 may monitor a pressure of contact between the user and a toy gun, and in response to that the contact pressure is greater than a preset value, the execution module 350 may control the toy gun manipulated by the user to switch from a handgun mode to a submachine gun mode. In this way, the user is only required to press the toy gun with a slightly great strength to switch between weapons of different types. Certainly, after switch between weapons is completed, the execution module 350 may further prompt the user by using a speech, a text, or the like, for example, notify the user, by using a speech, that a handgun has been currently switched to a submachine gun.

Or, for example, in a process of a shooting game of the user, the system 300 may monitor a pressure and a time of contact between the user and a toy gun, and in response to that the contact pressure is first greater than a first preset value, then less than a second preset value, and then greater than the first preset value, the execution module 350 may enter a gun loading command into a game console. In this way, the user can complete gun loading without leaving a screen while manipulating the toy gun, which helps to improve game experience. Certainly, after gun loading is completed, the execution module 350 may further prompt the user by using a speech, a text, or the like, for example, notify the user, by using a speech, that currently a gun is fully loaded.

Or, the system 300 may monitor a pressure of contact between the user and a car steering wheel, and in response to that the contact pressure is greater than a preset value, the execution module 350 may control a smart phone of the user to automatically match and establish a connection with a Bluetooth headset of the user. In this way, the user can answer, during driving, a call by using the Bluetooth headset without configuring a connection, which improves driving safety.

In conclusion, in the system according to this embodiment of the present application, a parameter of contact between a user body and an object can be obtained according to a signal characteristic of a received second wave signal, and a corresponding operation such as switching a mode, inputting content, matching a device, and prompting a user can be performed according to the contact parameter. In this way, information interaction between a user and the object or a corresponding device is naturally and efficiently completed.

Figure 6:
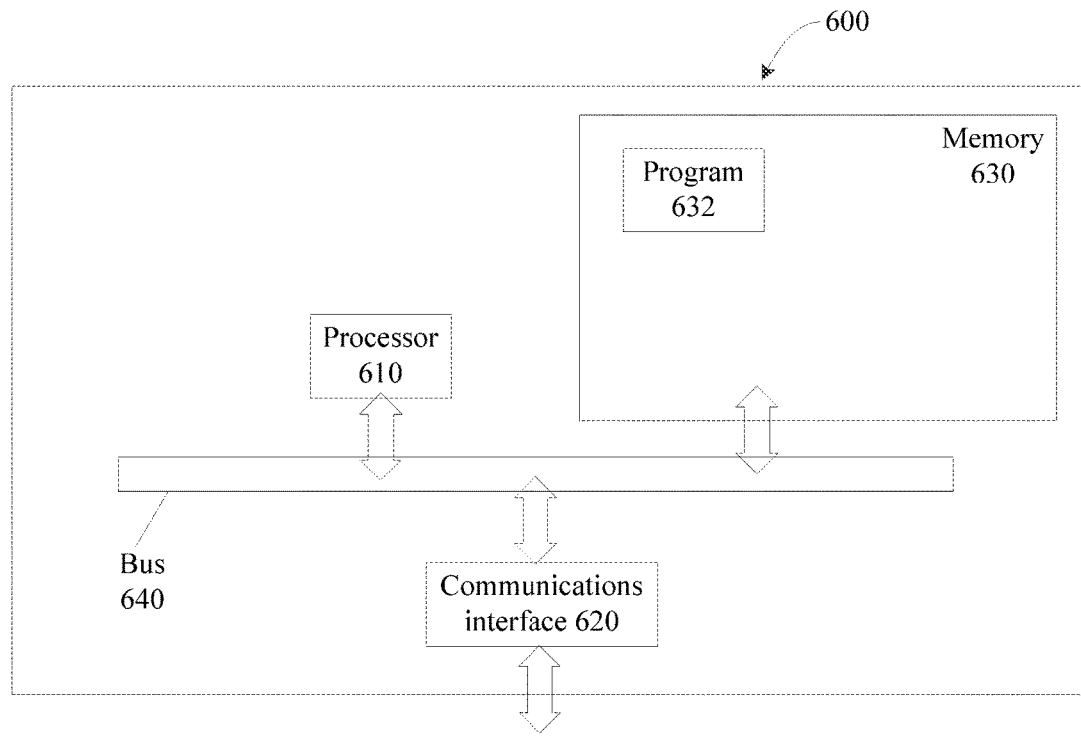
FIG. 6 is an example structural diagram of hardware of an interaction system according to an embodiment of the present application.

A hardware structure of an interaction system according to an embodiment of the present application is shown in FIG. 6. A specific embodiment of the present application is not intended to limit a specific implementation of the interaction system. Referring to FIG. 6, the interaction system 600 may comprise:

a processor 610, a communications interface 620, a memory 630, and a communications bus 640.

The processor 610, the communications interface 620, and the memory 630 complete communication with each other by using the communications bus 640.

The communications interface 620 is configured to communicate with another network element.

The processor 610 is configured to execute a program 632, and specifically can execute related steps in the method embodiments shown in FIG. 1 and FIG. 2.

Specifically, the program 632 may comprise program code, and the program code comprises a computer operation instruction.

The processor 610 may be a central processing unit (CPU), an application specific integrated circuit (ASIC), or one or more integrated circuits configured to implement the embodiments of the present application.

The memory 630 is configured to store the program 632. The memory 630 may comprise a high-speed RAM memory, and may also comprise a non-volatile memory, for example, at least one magnetic disk memory. The program 632 can specifically perform the following steps:

sending a first wave signal;

in response to contact between a user body and an object, receiving a second wave signal that corresponds to the first wave signal after the first wave signal is transmitted by using a medium comprising at least a part of the user body; and obtaining a parameter of the contact between the user body and the object according to a signal characteristic of the received second wave signal.

For specific implementations of steps in the program 632, reference may be made to related steps or modules in the foregoing embodiments, which are not described herein again. It may be clearly understood by a person skilled in the art that, for the purpose of a convenient and brief description, for specific working processes of the foregoing devices and modules, reference may be made to corresponding process descriptions in the foregoing method embodiments, which are not described herein again.

A person of ordinary skill in the art may be aware that, the exemplary units and method steps described in the embodiments disclosed in this specification may be implemented by electronic hardware, or a combination of computer software and the electronic hardware. Whether the functions are performed in a hardware manner or a software manner depends on particular applications and design constraint conditions of the technical solutions. A person skilled in the art may use different methods to implement the described functions for each particular application, but the implementation shall not be construed as exceeding the scope of the present application.

When the functions are implemented in a form of a software functional unit, and are sold or used as an independent product, the functions may be stored in a computer readable storage medium. Based on such an understanding, the technical solutions of the present application essentially, or the part contributing to the prior art, or a part of the technical solutions may be implemented in a form of a software product. The computer software product is stored in a storage medium and comprises several instructions for instructing a computer device (which may be a personal computer, a controller, a network device, or the like) to perform all or a part of the steps of the method described in the embodiments of the present application. The foregoing storage medium comprises: any medium that can store program code, such as a USB flash drive, a removable hard disk, a read-only memory (ROM), a random access memory (RAM), a magnetic disk, or an optical disc.

The foregoing example embodiments are only for the purpose of describing the present application, and are not intended to limit the present application. A person of ordinary skill in the art may make various changes and variations without departing from the spirit and scope of the present application; therefore, any equivalent technical solution falls within the scope of the present application, and the patent protection scope of the present application shall be defined by claims.

What is claimed is:

1. A method, comprising:
   sending, by a wearable system attached to a user comprising a processor, a first wave signal that transmits through a part of a body of the user as a medium to an object in touch with the user;
   receiving, by the wearable system, a second wave signal comprising:
      a first received wave signal transmitting through the same part of the body, the first received wave signal being a reflected wave formed by the first wave on a touched surface of the object after the first wave signal is reflected by the object, or
      a second received wave signal transmitting through a different part of the body, the second received wave signal being a transmitted wave formed after the first wave penetrates through the object;
   obtaining a parameter of the contact between the body of the user and the object according to a signal characteristic of the second wave signal, the parameter comprising at least one of: a contact time or a contact area; and
   executing a corresponding operation according to the parameter, the operation comprising at least one of switching a mode, inputting content, or matching a device.

2. The method of claim 1, wherein the first wave signal and the second wave signal are electromagnetic wave signals.

3. The method of claim 1, wherein at least the part of the body of the user comprises a hand of the user.

4. The method of claim 1, wherein the obtaining the parameter of the contact between the body of the user and the object according to the signal characteristic of the second wave signal comprises:
   obtaining the parameter of the contact between the body of the user and the object according to another signal characteristic, corresponding to a reference contact parameter, of the second wave signal and the signal characteristic of the second wave signal.

5. The method of claim 4, further comprising:
   pre-determining the other signal characteristic, corresponding to the reference contact parameter, of the second wave signal.

6. The method of claim 4, wherein the reference contact parameter comprises: a reference parameter value or a reference parameter interval.

7. The method of claim 1, wherein the signal characteristic of the second wave signal is related to at least one of an amplitude, a phase, or a frequency spectrum of the second wave signal.

8. The method of claim 7, wherein the signal characteristic of the second wave signal comprises at least one of a fingerprint, an average value, or a difference, and wherein
   the fingerprint is formed by at least one of the amplitude, the phase, or the frequency spectrum of the second wave signal;
   the average value is the average value of at least one of the amplitude, the phase, or the frequency spectrum of the second wave signal; and
   the difference is the difference of at least one of the amplitude, the phase, or the frequency spectrum of the second wave signal.

9. The method of claim 1, wherein the first wave signal and the second wave signal are acoustic wave signals.

10. The method of claim 9, wherein the first wave signal and the second wave signal are ultrasonic wave signals.

11. A wearable system, comprising:
    a processor, coupled to a memory, that executes executable modules stored in the memory, the executable modules comprising:
       a sending module that sends, by the wearable system attached to a user, a first wave signal that transmits through a part of a body of the user as a medium to an object in touch with the user;
       a receiving module that receives a second wave signal comprising
          a first received wave signal transmitting via the same part of the body, the first received wave signal being a reflected wave formed by the first wave on a touched surface of the object after the first wave signal is reflected by the object, or
          a second received wave signal transmitting through a different part of the body, the second received wave signal being a transmitted wave formed after the first wave penetrates through the object;

a processing module that obtains a parameter of the contact between the body of the user and the object according to a signal characteristic of the second wave signal, the parameter comprising at least one of: a contact time or a contact area; and an execution module that executes a corresponding operation according to the parameter, the operation comprising at least one of switching a mode, inputting content, or matching a device.

12. The system of claim 11, wherein the system comprises at least one of a wrist strap and a ring.

13. The system of claim 11, wherein the processing module obtains the parameter of the contact between the body of the user and the object according to another signal characteristic, corresponding to a reference contact parameter, of the second wave signal and the signal characteristic of the second wave signal.

14. The system of claim 13, wherein the executable modules further comprise:

a determining module that pre-determines the other signal characteristic, corresponding to the reference contact parameter, of the second wave signal.

15. A non-transitory computer readable medium, comprising at least one executable instruction, which, in response to execution, causes a wearable device, attached to a user, comprising a processor to perform operations, comprising:

sending a first wave signal that transmits through a part of a body of the user as a medium to an object in touch with the user;

receiving a second wave signal comprising:
a first received wave signal transmitted through the same part of the body, the first received wave signal being a reflected wave formed by the first wave on a touched surface of the object after the first wave signal is reflected by the object, or
a second received wave signal transmitting through a different part of the body, the second received wave signal being a transmitted wave formed after the first wave penetrates through the object;

obtaining a parameter of the contact between the body of the user and the object according to a signal characteristic of the second wave signal, the parameter comprising at least one of: a contact time or a contact area; and executing a corresponding operation according to the parameter, the operation comprising at least one of switching a mode, inputting content, or matching a device.

16. A wearable device, comprising a processor and a memory, the memory storing executable instructions, the processor being connected to the memory through a communication bus, and when the wearable device operates, the processor executes the executable instructions stored in the memory, so that the wearable device executes operations, comprising:

sending a first wave signal that transmits through a part of a body of the user as a medium to an object in touch with the user;

receiving a second wave signal comprising:
a first received wave signal transmitted through the same part of the body, the first received wave signal being a reflected wave formed by the first wave on a touched surface of the object after the first wave signal is reflected by the object, or
a second received wave signal transmitting through a different part of the body, the second received wave signal being a transmitted wave formed after the first wave penetrates through the object;

obtaining a parameter of the contact between the body of the user and the object according to a signal characteristic of the second wave signal, the parameter comprising at least one of: a contact time or a contact area; and executing a corresponding operation according to the parameter, the operation comprising at least one of switching a mode, inputting content, or matching a device.

17. The wearable device of claim 16, wherein the obtaining the parameter of the contact between the body of the user and the object according to the signal characteristic of the second wave signal comprises:

obtaining the parameter of the contact between the body of the user and the object according to another signal characteristic, corresponding to a reference contact parameter, of the second wave signal and the signal characteristic of the second wave signal.

18. The wearable device of claim 17, the operations further comprising:

pre-determining the other signal characteristic, corresponding to the reference contact parameter, of the second wave signal.

19. The wearable device of claim 17, wherein the reference contact parameter comprises: a reference parameter value or a reference parameter interval.

20. The wearable device of claim 16, wherein the signal characteristic of the second wave signal is related to at least one of an amplitude, a phase, or a frequency spectrum of the second wave signal.

21. The wearable device of claim 20, wherein the signal characteristic of the second wave signal comprises at least one of a fingerprint, an average value, or a difference, and wherein the fingerprint is formed by at least one of the amplitude, the phase, or the frequency spectrum of the second wave signal;

the average value is the average value of at least one of the amplitude, the phase, or the frequency spectrum of the second wave signal; and the difference is the difference of at least one of the amplitude, the phase, or the frequency spectrum of the second wave signal.

* * * * *